United States Patent
Oliver

[15] 3,697,924
[45] Oct. 10, 1972

[54] GROUNDING ELECTRICAL DEVICE AND BOX

[72] Inventor: Michael J. Oliver, 19741 N.W. 7th Court, Miami, Fla. 33169

[22] Filed: Nov. 12, 1970

[21] Appl. No.: 88,863

[52] U.S. Cl. ............... 339/14 R, 339/133 R, 174/51, 174/58
[51] Int. Cl. ............................................. H01r 3/06
[58] Field of Search........ 339/14, 133, 134, 154, 156; 174/51, 52, 53, 55, 56, 57, 58

[56] References Cited

UNITED STATES PATENTS

| | | | |
|---|---|---|---|
| 2,531,698 | 11/1950 | Petrick et al. | 174/58 X |
| 3,363,215 | 1/1968 | Smith | 339/14 R |
| 2,048,611 | 7/1936 | Kranz | 174/57 X |
| 2,934,590 | 4/1960 | Thompson et al. | 174/53 |
| 3,185,760 | 5/1965 | Despard | 174/54 |
| 2,568,942 | 9/1951 | Bindel | 248/27 |
| 3,432,793 | 3/1969 | Muska et al. | 339/14 |

*Primary Examiner*—Marvin A. Champion
*Assistant Examiner*—Robert A. Hafer
*Attorney*—Stevens, Davis, Miller & Mosher

[57] ABSTRACT

A grounding type electrical receptacle which utilizes a positive clamping arrangement between the strap of the receptacle and the grounded metal box to which it is attached by means of a screw-tightened grounding wedge. The box opening in which the receptacle fits has arcuate ends with no protruding ears so that the receptacle can be adjusted to proper vertical or horizontal alignment.

3 Claims, 8 Drawing Figures

PATENTED OCT 10 1972 3,697,924
SHEET 1 OF 2
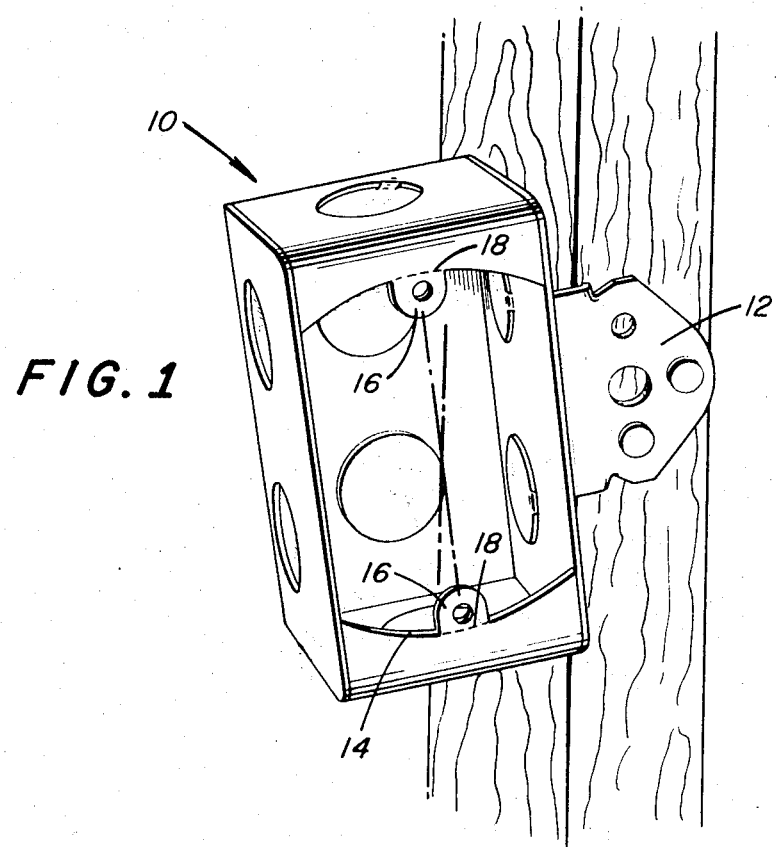
FIG. 1
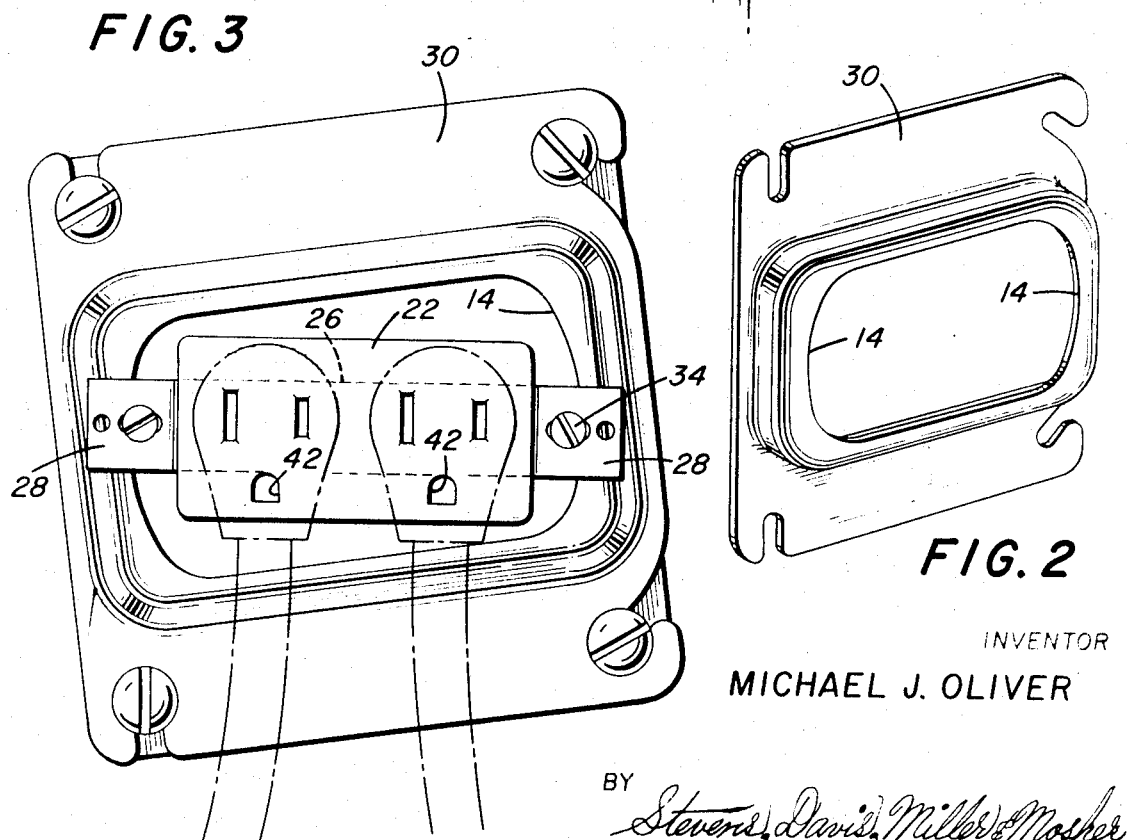
FIG. 3
FIG. 2
INVENTOR
MICHAEL J. OLIVER
BY Stevens, Davis, Miller & Mosher
ATTORNEYS

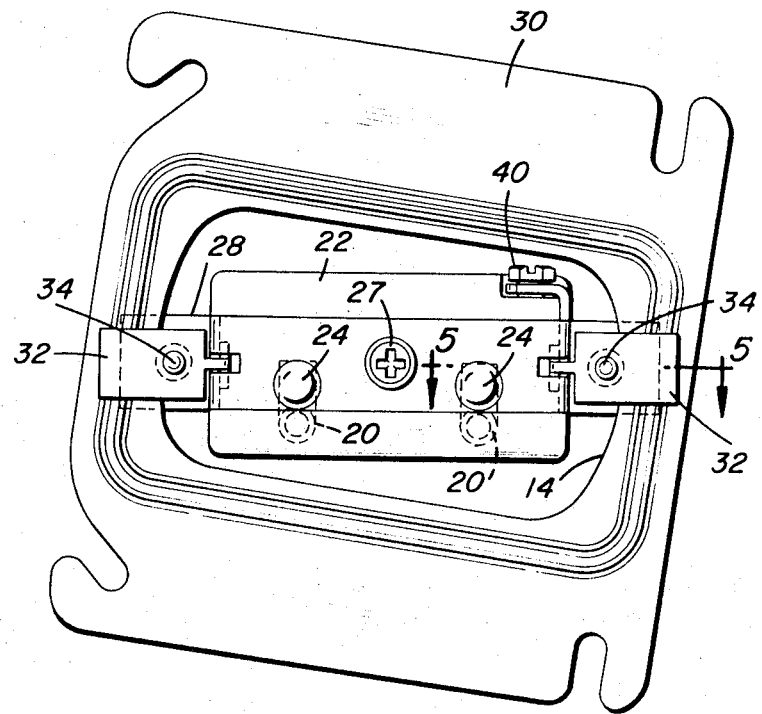
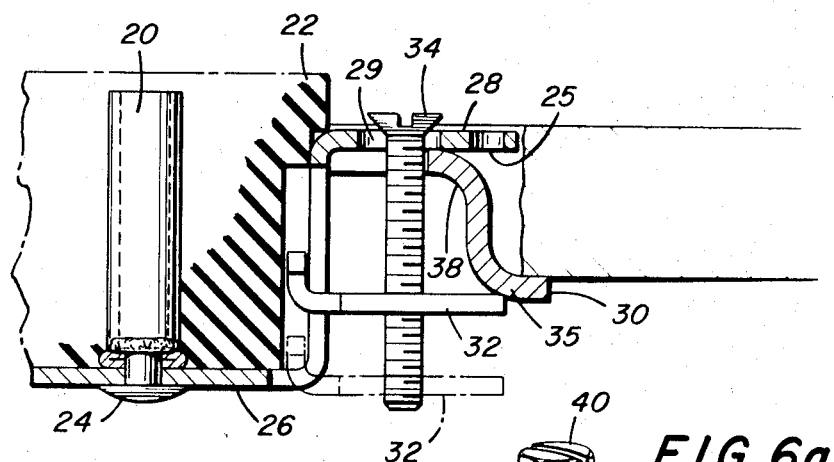
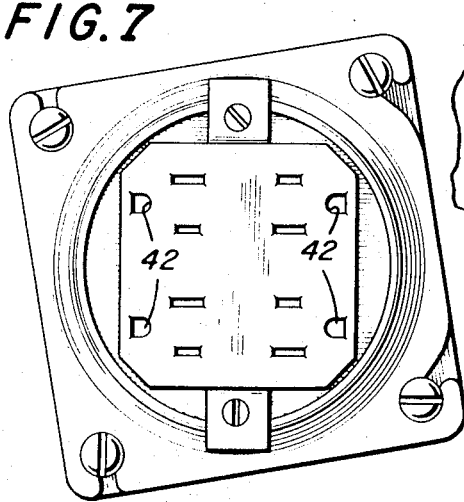
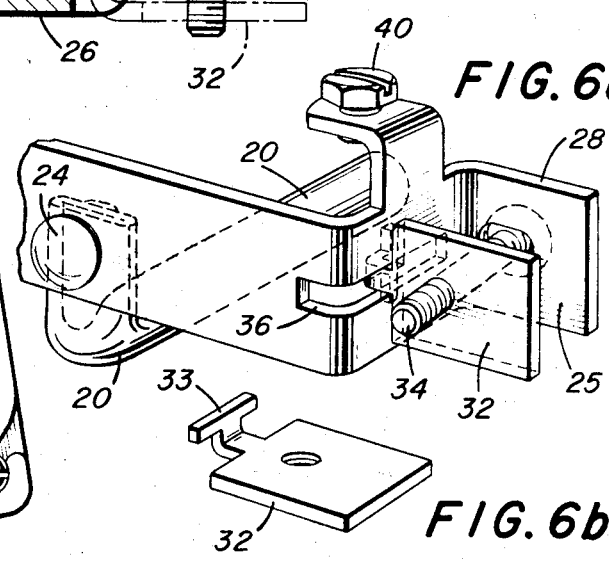

GROUNDING ELECTRICAL DEVICE AND BOX

This invention relates to electrical wiring devices and more particularly to devices which have two current carrying conductors and a third grounding conductor which is not normally current carrying. Such grounding is required in many installations today and the conventional provision is a pair of parallel blades in an attachment cap which connects the current carrying conductors to a receptacle, and a third blade, U-shaped in cross-section, to similarly connect a grounding conductor. The grounding conductor is connected to the external frame of the appliance or motor being supplied by the cord and connections within the receptacle device carry a separate grounding conductor back to the service entrance equipment where a separate connection is made to a positive ground such as a water pipe or rod driven in the earth. Such a grounding system provides positive protection against shock hazards in an electrical system where the neutral conductor is at earth potential.

However, in the installation of such grounding type devices, particularly duplex wall receptacles, considerable delays and difficulties are experienced due to the type of equipment presently available. A square or rectangular metal box is usually placed in or on a wall for housing the electrical receptacle and that outlet is fed by a pipe or cable which connects to a knockout in the box. A separate grounding conductor is usually brought into the box along with the current carrying conductors and it must be connected not only to the frame of the box, but also to the receptacle itself. Thus, two separate connections are needed for the grounding wire but only one connection is needed for the current carrying wires. Usually the terminals of the receptacle which receive the U-shaped grounding blade are attached to a metal strap which is an integral part of the receptacle. This strap is brought out on each end of the receptacle and provided with holes through which screws are inserted in order to attach the receptacle to the outlet box which has previously been positioned within or on the surface of the wall. To keep the screws in place during shipping and handling (prior to installation) the screws are usually held in place by small pieces of fiberboard which are slid over the screws after they are inserted in their holes. When the receptacle is attached to the outlet box, these pieces of fiberboard are usually left in place and, unfortunately, provide an insulation rather than a conducting path between the grounded outlet box and the strap of the receptacle to which the grounding blades are in contact. Thus, it is necessary to provide a separate grounding means, usually a machine screw tapped into the receptacle strap itself, so that the grounding conductor can be brought out of the outlet box and separately secured to the strap of the receptacle.

A further problem is entailed in conventional electrical equipment when an outlet box is positioned in or on a wall at any marked degree away from desired vertical or horizontal alignment. Most electrical devices such as switches or receptacles have a slotted hole for adjusting the horizontal or vertical alignment of the device but this slot only allows for perhaps a ten percent variation in alignment. Thus, great care must be taken in rough installation work to be certain that outlet boxes are approximately vertical (or horizontal) in order to avoid a crooked installation when the receptacles or switches are installed after the finished wall surface has been applied.

A further difficulty in prior art electrical receptacles is the fact that many attachment caps especially those on large appliance cords are made so that the blades extend at a right angle to the cord itself. This is, of course, advantageous in keeping the cord flat against the wall adjacent the receptacle but, due to the positioning of the grounding slot in most receptacles, it is impossible to run two right angled attachment caps from the same duplex receptacle since the cord of one cap will overlap the openings designed for the other cap.

It is an object of this invention to provide an electrical receptacle which can be positively grounded to its outlet box by clamping means which engage the edge of the box or cover thereof.

Another object is to provide a grounding means for an electrical receptacle which is faster and easier to install yet provides firm support for the receptacle itself.

Another object of this invention is to provide means for vertically or horizontally mounting an electrical device in an outlet box which is not secured in such alignment.

A further object of this invention is to provide an electrical receptacle which has the slots for the U-shaped grounding blade so positioned that more than one right angle attachment cap can be plugged into a duplex or quadruple receptacle.

It should be understood that this invention contemplates a new system of electrical devices, particularly receptacles, which when all the components are used together, will provide a much faster, easier and more positive grounding facility but at the same time is entirely compatible with existing standards so that one or more of the elements of the new system can be used with conventional equipment or all of the elements can be used together.

Other objects and advantages will become apparent from the attached drawings which are designed to illustrate, by way of example and not limitation, a preferred embodiment of the present invention, in which:

FIG. 1 shows an outlet box with detachable ears which has been mounted crooked and would normally present a problem in installing a vertical outlet;

FIG. 2 is a plaster ring cover plate having an arcuate opening without mounting ears designed for attachment to a standard square outlet box;

FIG. 3 shows the plate of FIG. 2 mounted on an outlet box which is crookedly installed but the receptacle on it has been adjusted to be horizontal;

FIG. 4 is a rear view of the illustration of FIG. 3;

FIG. 5 is a view in section along line 5—5 of FIG. 4;

FIGS. 6a and 6b show details of the mounting bracket of FIG. 5;

FIG. 7 shows a double duplex receptacle with the slots for the U-shaped grounding terminals positioned to permit more ready attachment by right angle attachment caps. Turning now to the drawings in greater detail, FIG. 1 shows (a wallcase, handy box) 10 secured to a wall stud by means of a mounting bracket 12. Instead of the conventional rectangular opening on the front of the box, the upper and lower edges of the opening have an arcuate shape 14 and have ears 16 which are mounted by means of perforations 18 so that they can be easily broken off to leave a smooth arcuate opening at each end. The advantages of the arcuate opening will be explained in connection with the mounting of the receptacle.

Turning now to FIGS. 5 and 6, a broken away portion of electrical outlet 22 of FIG. 4 is shown having a sleeve 20 which acts as the contacting surface for a U-shaped grounding blade of an attachment cap inserted therein. This sleeve 20 is secured by means of a rivet 24 to the strap 26 which forms the backbone of the receptacle and is secured thereto by a screw 27 (see FIG. 4). It should be understood that the receptacle is conventional in the type of contacts for receiving the current carrying blades and insulation surrounding them and those known parts have not been illustrated in detail. The strap 26 is substantially U-shaped and runs the entire length of the back of the receptacle with an outwardly projecting ear 28 on each end thereof as can be better seen in FIGS. 3 and 4. The ear 28 has an oblong hole 29 through which passes a screw 34 which is threaded into grounding wedge 32 having a "T" shaped extension 33 which projects into a slot 36 in strap 26. The outlet is inserted in the opening of the cover 30 so that the inside surface 25 of the ear 28 comes to rest against the outside raised surface of the cover 30. The screw 34 is then turned so as to draw the grounding wedge 32 from the lower position shown in dotted lines in FIG. 5 to its upper clamping position where it contacts the underside of cover plate 30. In FIG. 5, the point of contact is at 35 but it should be understood that if the opening is slightly larger, the grounding wedge 32 could be drawn all the way up so that it would contact the underside of the cover plate at point 38 or intermediate points also. The "T" shaped extension 33, of course, remains in the slot 36 and guides the wedge 32 as it is drawn upwardly by screw 34. Thus, a very firm and solid mechanical and electrical connection can be accomplished between the strap 26 of the receptacle and the cover 30 which is in turn mechanically and electrically secured to the outlet box. This box, as previously described, has been electrically grounded to the grounding conductor of the cable feeding it. Hole 29 is made oblong in a direction parallel with the length of the strap (see FIG. 6a) so that the screw 34 and wedge 32 may be laterally displaced as the screw is tightened in order to insure good contact between the wedge 32 and the cover 30.

If it is desired to mount the receptacle shown in FIGS. 5 and 6 in a standard box which has a lip with a tapped hole projecting from it rather than an arcuate end (such as in repair work), this can easily be accomplished by removing and discarding grounding wedge 32. It is then, of course, necessary to separately attach a grounding wire in order to insure a positive connection for the U-shaped grounding blade and thus a conventional grounding screw 40 is also provided.

As previously mentioned, the grounding receptacle of this invention is preferably used with a box or cover plate which has an arcuate opening. In the box of FIG. 1, break-off ears were provided so that a standard receptacle could be mounted therein, the arcuate front wall of the box which is formed of bent over extensions of the top and bottom walls also giving additional strength and rigidity. Preferably, as shown in FIG. 2, a cover plate or plaster ring for a conventional square outlet box is provided with an arcuate shape on its two short sides. Although FIG. 2 illustrates a plaster ring 30 with no ears projecting from the arcuate ends, it should be understood that as part of the system of this invention such a plate could also be manufactured in order to make it easier to use standard receptacles interchangeably with those of the present invention. If it were contemplated to use the present grounding system throughout a new construction job, then plates similar to those of FIG. 2 would be used throughout; for repairs or use by small contractors, plates with breakaway tapped ears would probably be used.

In FIG. 7, a two gang duplex receptacle in a single housing is shown mounted in a plate somewhat similar to that illustrated in FIG. 2 except that the opening is round rather than oblong, thus, such an opening has a continuous arcuate edge. A single gang receptacle could also be mounted in a circular opening provided the outside trim of the plate or cover (which would be attached after all connections were complete) were large enough to cover the opening. With such a round opening, of course, 360° of adjustment is possible thus enabling the installer to decide at the last moment whether a particular outlet should be positioned vertically or horizontally.

In another aspect of this invention, the slots 42 to receive the U-shaped grounding terminal are located to the outside of the current carrying slots. This can be accomplished as shown in FIG. 3 for a single gang receptacle or as shown in FIG. 7 for a two gang receptacle. In both cases, the grounding slots 42 are positioned in the same relationship to the current carrying slots as in standard receptacles (so as to accept a standard grounding attachment cap) but the three slots are turned 90° in the receptacle so that the current carrying slots run perpendicular to, rather than parallel to, the strap of the receptacle. The benefit of such an arrangement is clearly shown by the fact that two right angle attachment caps are inserted in the receptacle (in phantom lines) in FIG. 3. Similarly, four right angle caps could be run from the outlet shown in FIG. 7.

It should be understood that this invention is not limited by the foregoing description which is by way of example only but as defined in the following claims.

I claim:

1. An electrical receptacle device comprising:

a. an opening in a grounded electrically conductive material with an interior edge, said edge being arcuately shaped on opposite sides;

b. slot means on the front of the receptacle to receive and electrically connect to the blades of an attachment cap inserted therein, one of said slots being for grounding;

c. means for mounting said receptacle in said opening comprising ears projecting from opposite ends of the receptacle said ears being spaced apart a distance to overlap the edges of said opening and electrically connected to said grounding slot;

d. wedge means slideably mounted by a groove at the end of the receptacle, said groove extending substantially perpendicular to each said ear so that the edge of said opening can be clampingly engaged between said ear and wedge to establish an electrical connection between said grounding slot and said edge.

2. A grounding type electrical receptacle comprising:
a. a body of insulating material having a strap of conductive material extending across the back thereof with an ear projecting on each end of the strap;
b. at least two slots on the front of the receptacle to receive and electrically connect the blades of an attachment cap inserted therein;
c. at least one additional grounding slot on the front of the receptacle to receive and electrically connect the grounding blade of an attachment cap, said grounding slot being electrically connected to said strap;
d. means for mounting said receptacle in an opening in grounding electrically conductive material with an inwardly extending edge comprising an opening through said ear, a threaded screw in said opening and a wedge means slideably mounted by a groove at the end of the receptacle, said groove extending substantially perpendicular to said ear, said wedge means being threaded onto said screw so that wedge means will move toward said ear when the screw is tightened to clampingly engage said inwardly extending edge to establish a grounding connection between said grounding slot and said edge.

3. The receptacle of claim 2 wherein the groove is in the strap in a portion perpendicular to and adjacent to each ear and said wedge means has a T shaped projection engaged in said groove to guide it as the screw is tightened.

* * * * *